US012766509B2

(12) United States Patent
Jones et al.

(10) Patent No.: US 12,766,509 B2
(45) Date of Patent: Oct. 20, 2026

(54) PRESSURE-ASSISTED FLOW IN A MICROFLUIDIC SYSTEM

(71) Applicant: miDiagnostics NV, Heverlee (BE)

(72) Inventors: Benjamin Jones, Leuven (BE); Stephane Donnay, Leuven (BE)

(73) Assignee: miDiagnostics NV, Heverlee (BE)

( * ) Notice: Subject to any disclaimer, the term of this patent is extended or adjusted under 35 U.S.C. 154(b) by 976 days.

(21) Appl. No.: 17/775,539

(22) PCT Filed: Nov. 13, 2020

(86) PCT No.: PCT/EP2020/082138

§ 371 (c)(1),
(2) Date: May 9, 2022

(87) PCT Pub. No.: WO2021/094585

PCT Pub. Date: May 20, 2021

(65) Prior Publication Data

US 2023/0013681 A1 Jan. 19, 2023

(30) Foreign Application Priority Data

Nov. 15, 2019 (EP) .................................... 19209427

(51) Int. Cl.
*B01L 3/00* (2006.01)
*F16K 99/00* (2006.01)

(52) U.S. Cl.
CPC ...... *B01L 3/50273* (2013.01); *F16K 99/0017* (2013.01); *B01L 2200/0684* (2013.01);
(Continued)

(58) Field of Classification Search
CPC ......... B01L 3/50273; B01L 2200/0684; B01L 2400/0406; B01L 2400/049;
(Continued)

(56) References Cited

U.S. PATENT DOCUMENTS

2008/0003690 A1* 1/2008 Chow .................. B01J 19/0093 436/179
2011/0120562 A1* 5/2011 Tan .................. G01N 33/54366 137/583
2018/0059105 A1* 3/2018 Lowe ............... G01N 33/54366

FOREIGN PATENT DOCUMENTS

EP 3395445 A1 10/2018
EP 3520894 A1 8/2019
WO 2007110779 A2 10/2007

OTHER PUBLICATIONS

Olanrewaju, A., et al., Capillary microfluidics in microchannels: from microfluidic networks to capillaric circuits, Lab on a Chip, Jul. 16, 2018, vol. 18, No. 16, pp. 2323-2347.

* cited by examiner

*Primary Examiner* — Jennifer Wecker
*Assistant Examiner* — Britney N. Washington
(74) *Attorney, Agent, or Firm* — Hodgson Russ LLP

(57) ABSTRACT

The present inventive concept relates to a microfluidic system for pressure-assisted capillary-driven flowing of a liquid. The system comprises: a first sub-system comprising a capillary flow channel, having a first flow resistance, arranged to receive the liquid and to flow the liquid along the capillary flow channel; a second sub-system comprising a pressure-assisting flow channel, having a second flow resistance, arranged to receive the liquid from the capillary flow channel, and to provide a pressure-assisted flow of the liquid in a direction away from the capillary flow channel; and a capillary valve, having a third flow resistance, comprising a capillary portion, wherein the capillary portion at a first end is connected to an interface between the capillary flow channel and the pressure-assisting flow channel, and at a second end is communicating with gaseous medium. The first flow resistance is larger than the third flow resistance,
(Continued)

and the second flow resistance is larger than the third flow resistance, such that the liquid is flowing predominantly by capillary action in the capillary flow channel until a forefront of the liquid has reached the interface with the pressure-assisting flow channel, and by pressure-assisted capillary action after the forefront of the liquid has reached the interface with the pressure-assisted flow channel. The present inventive concept further relates to a diagnostic device and a lab-on-a-chip device, comprising the microfluidic system.

12 Claims, 3 Drawing Sheets

(52) U.S. Cl.
CPC . *B01L 2400/0406* (2013.01); *B01L 2400/049* (2013.01); *B01L 2400/0688* (2013.01); *B01L 2400/0694* (2013.01)

(58) Field of Classification Search
CPC ..... B01L 2400/0688; B01L 2400/0694; B01L 2200/00; F16K 99/0017
See application file for complete search history.

PRESSURE-ASSISTED FLOW IN A MICROFLUIDIC SYSTEM

TECHNICAL FIELD

The present inventive concept relates to a microfluidic system for pressure-assisted capillary-driven flowing of a liquid.

BACKGROUND

Capillary-driven microfluidic devices rely on capillary forces between a liquid-vapor interface and the surface of a channel or porous media to pump the liquid. By carefully engineering of geometry and structure of the microfluidic device, various processes can be implemented such as, for example, valving, mixing, dilution, and metering.

Pressure driven microfluidic devices rely on integrated or external pumps to pressurize and pump the liquid.

A pressure-assisted capillary-driven device typically relies on an external, pressure source (i.e., a vacuum) to assist liquid flow in a capillary-driven device. The pressure source may be of negative type, such as provided by vacuum, or of positive type.

It is problematic with capillary-driven devices to promote flow without undesired stoppage of the liquid. Careful tailoring of dimensions of microfluidic structure is often necessary and challenging. Particularly interfacing two separately manufactured microfluidic chips is challenging and prone to flow stoppage or other negative effects on the flow. Limitations in manufacturing tolerances often require that fluidic coupling structures are large enough to facilitate alignment between mating parts. However, large structures, in particular flow channels with large cross-sectional areas, result in capillary forces being low and there is an increased risk of flow stoppage.

A capillary-driven flow necessitates surfaces that the fluid can wet. For aqueous solutions, the surface must be hydrophilic. This results in design and manufacturing constraints on the system, such as restrictions in terms of materials that can be used, when compared to pressure-driven microfluidic systems.

It is a problem with pressure-assisted systems that the pressure-assistance has effect on connected capillary driven systems, where purely capillary driven flows may be desirable, in which case the pressure source has to be switched on or off adding problems associated with controlling the pressure source.

SUMMARY

One aim of the present inventive concept is solving at least one problem with prior art.

According to a first inventive concept there is provided a microfluidic system for pressure-assisted capillary-driven flowing of a liquid, the system comprising: a first sub-system comprising a capillary flow channel, having a first flow resistance, arranged to receive the liquid and to flow the liquid along the capillary flow channel; a second sub-system comprising a pressure-assisting flow channel, having a second flow resistance, arranged to receive the liquid from the capillary flow channel, and to provide a pressure-assisted flow of the liquid in a direction away from the capillary flow channel; and a capillary valve, having a third flow resistance, comprising a capillary portion, wherein the capillary portion at a first end is connected to an interface between the capillary flow channel and the pressure-assisting flow channel, and at a second end is communicating with gaseous medium; wherein the first flow resistance is larger than the third flow resistance, and the second flow resistance is larger than the third flow resistance, such that the liquid is flowing predominantly by capillary action in the capillary flow channel until a forefront of the liquid has reached the interface with the pressure-assisting flow channel, and by pressure-assisted capillary action after the forefront of the liquid has reached the interface in the pressure-assisted flow channel Further, provided is a microfluidic system for pressure-assisted capillary-driven flowing of a liquid, the system comprising: a first sub-system comprising a capillary flow channel, arranged to provide a first flow resistance, arranged to receive the liquid and to flow the liquid along the capillary flow channel; a second sub-system comprising a pressure-assisting flow channel, arranged to provide a second flow resistance, arranged to receive the liquid from the capillary flow channel, and to provide a pressure-assisted flow of the liquid in a direction away from the capillary flow channel; and a capillary valve, comprising a capillary portion, wherein the capillary portion at a first end is connected to an interface between the capillary flow channel and the pressure-assisting flow channel, and at a second end connected to a non-capillary portion communicating with gaseous medium, wherein the capillary valve is arranged to provide a third flow resistance (R3); wherein the first flow resistance is larger than the third flow resistance, and the second flow resistance is larger than the third flow resistance, thereby arranged to allow the liquid to flow predominantly by capillary action in the capillary flow channel until a forefront of the liquid has reached the interface with the pressure-assisting flow channel, and by pressure-assisted capillary action after the forefront of the liquid has reached the interface in the pressure-assisted flow channel.

According to a second inventive concept there is provided a diagnostic device comprising a microfluidic system according to the first inventive concept.

According to a third inventive concept there is provided a lab-on-a-chip device comprising a microfluidic system according to the first inventive concept.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
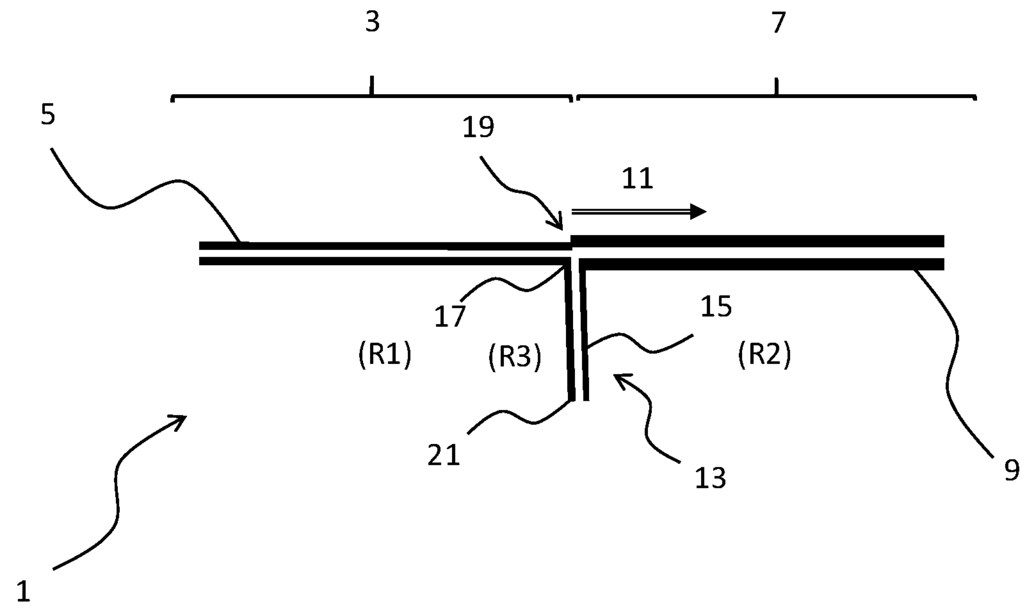
FIG. 1 is a schematic illustration of a system according to an embodiment.

In view of the above, it would be desirable to achieving a system for pressure-assisted capillary-driven flowing of a liquid, which are not compromised by problems associated with prior art. An objective of the present inventive concept is to address this issue and to provide solutions to at least one problem or need related to prior art. Further and alternative objectives may be understood from the following.

Disclosures herein relating to one inventive aspect of the inventive concept generally may further relate to one or more of the other aspect(s) of the inventive concept.

It shall be realized that flow channels of the present system may be arranged or designed to provide desired flow resistances, relationship between the different flow resistances, and capillary pressures. It shall further be realized that flow resistance and capillary pressure depend on factors, such as, for example, including properties of the liquid, such as viscosity, concentrations of electrolytes and additives, type of liquid or solvents; dimensions and materials of the flow channels and interfaces, and temperature of the liquid. Desirable or suitable flow resistances, capillary flows, capillary pressures, and capillary resistances may be achieved, for example, by known techniques.

With the flow of liquid in the capillary flow channel being unperturbed, as used herein, is intended to describe that the flow to a major part is governed by properties of the first sub-system and to a minor part, by pressure-assistance from the second sub-system. Preferably, the flow is at least to 90%, more preferably from 90% to 100%, governed by properties of the first sub-system and/or preferably to less than 10%, more preferably 10% to 0%, by pressure-assistance from the second sub-system. Thus, unperturbed capillary flow in the first sub-system shall not be understood as a capillary flow without any influence from the pressure-assisting flow channel, although such a flow may be achieved and may be desirable. The capillary flow may in part be influenced by the pressure-assisting and still be in accordance with the present aspects.

According to a first inventive concept there is provided a microfluidic system for pressure-assisted capillary-driven flowing of a liquid, the system comprising: a first sub-system comprising a capillary flow channel, having a first flow resistance, arranged to receive the liquid and to flow the liquid along the capillary flow channel; a second sub-system comprising a pressure-assisting flow channel, having a second flow resistance, arranged to receive the liquid from the capillary flow channel, and to provide a pressure-assisted flow of the liquid in a direction away from the capillary flow channel; and a capillary valve, having a third flow resistance, comprising a capillary portion, wherein the capillary portion at a first end is connected to an interface between the capillary flow channel and the pressure-assisting flow channel, and at a second end is communicating with gaseous medium; wherein the first flow resistance is larger than the third flow resistance, and the second flow resistance is larger than the third flow resistance, such that the liquid is flowing predominantly by capillary action in the capillary flow channel until a forefront of the liquid has reached the interface with the pressure-assisting flow channel, and by pressure-assisted capillary action after the forefront of the liquid has reached the interface in the pressure-assisted flow channel.

Further, there is provided a microfluidic system for pressure-assisted capillary-driven flowing of a liquid, the system comprising: a first sub-system comprising a capillary flow channel, arranged to provide a first flow resistance, arranged to receive the liquid and to flow the liquid along the capillary flow channel; a second sub-system comprising a pressure-assisting flow channel, arranged to provide a second flow resistance, arranged to receive the liquid from the capillary flow channel, and to provide a pressure-assisted flow of the liquid in a direction away from the capillary flow channel; and a capillary valve, comprising a capillary portion, wherein the capillary portion at a first end is connected to an interface between the capillary flow channel and the pressure-assisting flow channel, and at a second end connected to a non-capillary portion communicating with gaseous medium, wherein the capillary valve is arranged to provide a third flow resistance (R3); wherein the first flow resistance is larger than the third flow resistance, and the second flow resistance is larger than the third flow resistance, thereby arranged to allow the liquid to flow predominantly by capillary action in the capillary flow channel until a forefront of the liquid has reached the interface with the pressure-assisting flow channel, and by pressure-assisted capillary action after the forefront of the liquid has reached the interface in the pressure-assisted flow channel.

The capillary flow channel enables flowing of the liquid by capillary action.

The pressure-assisting flow channel allows pressure-assisted flowing of the liquid in the system.

The capillary valve enables a flow of fluid from the capillary valve and into the pressure-assisted flow channel. The capillary portion of the capillary valve enables prevention of gas bubbles from entering the interface via the capillary valve. The capillary portion further allows the liquid to flow from the interface into the capillary portion and, thus, into the capillary valve by capillary action, thereby, for example, providing the prevention of gaseous bubbles from entering the interface. The capillary valve, thus, may provide efficient inherent control of flows without a need for mechanical switches or monitoring.

The first sub-system may further comprise a plurality of capillary flow channels, for example a network of capillary flow channels.

The first sub-system may be arranged for, for example, mixing, dilution, addition of reagents or additives and/or performing reaction. For example, the first sub-system may comprise a mixer for mixing, such as a mixing chamber, and/or a reaction chamber for performing reaction. The first sub-system may be further arranged to receive a plurality of liquids from a plurality of sources. For example, the capillary flow channel(s) may be connected to a plurality of flow channels from such sources to receive a plurality of liquids.

The second sub-system may further comprise a plurality of pressure-assisting flow channels with a single interface to the capillary flow sub-system, for example a network of such pressure-assisting flow channels.

The second sub-system may be arranged for performing detection, such as by comprising a detector. The detection may be, for example, light spectroscopy.

The first flow resistance (R1), the second flow resistance (R2), and the third flow resistance (R3) each may be in relation to the gaseous medium. The first flow resistance (R1), the second flow resistance (R2), and the third flow resistance (R3) may be determined or calculated based on the gaseous medium. Thus, the first flow resistance (R1) being larger than the third flow resistance (R3), and the second flow resistance (R2) being larger than the third flow resistance (R3), may be when comparing R1, R2, and R3 as filled with the gaseous medium. It shall be realized that flow channels of the microfluidic system being in fluidic communication with the capillary valve, for example the capillary flow channel and/or the pressure-assisting flow channel, also may be communicating with the gaseous medium and may be filled with the gaseous medium. The gaseous medium may be, for example, air.

The resistance of the first sub-system may be considered dependent on the amount of liquid penetration into the first sub-system and is the sum of the gas and liquid phase resistances for a partially filled system. To ensure that the system is not or to a minor extent influenced by the pressure-assisted vacuum source during early stages of capillary flow such as before liquid has penetrated far into the first sub-system and when the resistance is dominated by the gas phase component, the gas phase resistance R1 may desirably be greater than R3.

The capillary valve may be a capillary stop valve.

The first flow resistance may be above 5 times the third flow resistance, and the second flow resistance may be above 5 times the third flow resistance. In particular, the first flow resistance may be above 10 times the third flow resistance.

The microfluidic system may comprise one or more additional capillary flow channels arranged on the first subsystem and/or on one or more additional sub-systems. The one or more additional capillary flow channels may be interfaced with additional pressure-assisted flow channels and additional capillary valves similarly to what has been described with reference to the capillary flow channel and the pressure-assisting flow channel in the microfluidic system.

The first flow resistance may be larger than or equal to ten times the third flow resistance. Thereby, unperturbed flow in the capillary flow channel may be realized.

The first, second and third flow-resistances may be selected or set by, for example, selecting suitable capillary channel lengths, cross-sectional dimensions, and geometries.

The pressure-assisting flow channel may further be arranged to be connected to an under-pressure source, such as a vacuum source, preferably providing a pressure in the pressure-assisting flow channel being lower than the pressure of the gaseous medium communicating with the capillary valve.

Thereby, the gaseous medium may be flowing in a direction from the capillary valve and into the pressure-assisting flow channel. The gaseous medium may be flowing until a forefront of the liquid has reached the interface and the capillary portion of the capillary valve.

The capillary pressure in the capillary portion of the capillary valve may be larger that the pressure generated by the under-pressure source, at the interface between the capillary flow channel and the pressure-assisting flow channel.

Thereby, prevention of gaseous bubbles from entering the interface via the capillary valve may be realized.

The capillary valve may communicate with gaseous medium at ambient pressure, preferably ambient air.

Thereby, an ample supply of gaseous medium for the bypass may be provided.

The gaseous medium may be gas, provided at ambient conditions, for example at normal pressure and/or room temperature, for example 20 to 25° C.

The capillary flow channel may have a circular cross-section having a diameter in a range of 1-500 micrometers, or a rectangular cross-section having a dimension in a range of 1-500 micrometers; the pressure-assisting flow channel may have a circular cross-section having a diameter in a range of 10-2500 micrometers, or a rectangular cross-section having a width and a height both in a range of 10-2500 micrometers; and the capillary portion of the capillary valve may have a circular cross-section having a diameter in a range of 1-500 micrometers, or a rectangular cross-section having a dimension in a range of 1-500 micrometers. Such dimensions enable capillary action in the capillary flow channel and in the capillary portion of the capillary valve, and pressure-assisting by the pressure-assisting flow channel.

The dimension may be, for example, a width or a height of the rectangular cross-section.

It shall be realized that further cross-sectional shapes of the channels may be provided and used with the system. For example, oval, triangular, parallelepiped shapes, and additional polygonal shapes. The circular and rectangular shapes are provided as examples of cross-sectional shapes.

The capillary flow channel, the pressure-assisting flow channel and the capillary portion of the capillary valve, respectively, may have walls produced from or composed of a material selected from silicon, glass, polymers, ceramics, and metals, or combinations thereof.

The first and the second sub-systems may be provided on one or more microfluidic chips.

The microfluidic system may thereby, and for example, be comprised on a single chip, or may comprise a plurality of interconnected chips.

The capillary portion of the valve may connect to the interface perpendicularly to a common longitudinal central axis of the capillary flow channel and the pressure-assisting flow channel.

The second end of the capillary portion of the valve may be connected to a non-capillary portion.

Thereby, the capillary flow in the capillary portion may be stopped at the non-capillary portion, thus preventing liquid from flowing out of or being drained off the capillary valve.

The microfluidic system for pressure-assisted capillary-driven flowing of liquid, may comprise:

a first sub-system comprising two or more capillary flow channels, each having a first flow resistance, arranged to receive liquid and to flow liquid along the capillary flow channel, a second sub-system comprising two or more of pressure-assisting flow channels, each having a second flow resistance, wherein each of the two or more of pressure-assisting flow channels is associated with one of the two or more capillary flow channels, respectively and arranged to receive the liquid from the associated capillary flow channel, and to provide a pressure-assisted flow of the liquid in a direction away from the associated capillary flow channels, and two or more capillary valves, each connected to one of the one or more capillary flow channels, respectively, each of the two or more capillary valves having a third flow resistance and a capillary portion, wherein each of the capillary portions at a first end is connected to an interface between the connected capillary flow channel and the associated pressure-assisting flow channel, and at a second end is communicating with gaseous medium, wherein each of the first flow resistances of the two or more capillary flow channels is larger than the third flow resistance of the connected capillary valve, and each of the second flow resistances of the two or more pressure-assisting flow channels is larger than the third flow resistance of the connected capillary valve, such that the liquid is flowing predominantly by capillary action in each of the capillary flow channels until a forefront of the liquid has reached the interface with the pressure-assisting flow channel, and by pressure-assisted capillary action after the forefront of the liquid has reached the interface with the pressure-assisted flow channel.

The microfluidic system comprising a first sub-system comprising two or more capillary flow channels, and a second sub-system comprising two or more of pressure-assisting flow channels, may have two or more of the pressure-assisting flow channels, preferably all, further arranged to be connected to one under-pressure source, such as a vacuum source, preferably providing a pressure in the pressure-assisting flow channel being lower than the pressure of the gaseous medium communicating with the capillary valve.

It is an advantage that it is enabled to pressure assist a plurality of flow channels with a single under-pressure source, without needing active valves or controls to assist the plurality of flow channels.

The first flow resistance (R1*a*, R1*b*) may be in relation to the gaseous medium, the second flow resistance (R2*a,b*) may be in relation to the gaseous medium, and the third flow resistance (R3*a,b*) may be in relation to the gaseous medium.

The two or more capillary flow channels may be provided on a single platform or on a plurality of platforms, such as a separate platform for each flow channel. The platforms may be, for example, microfluidic chips.

According to a second inventive concept there is provided a diagnostic device comprising a microfluidic system according to concepts and embodiments disclosed herein.

According to a third inventive concept there is provided a lab-on-a-chip device comprising a microfluidic system according to concepts and embodiments disclosed herein.

With reference to FIG. 1 a microfluidic system 1 for pressure-assisted capillary-driven flowing of a liquid will now be described. The system 1 comprises: a first sub-system 3 comprising a capillary flow channel 5, having a first flow resistance (R1), arranged to receive the liquid (not illustrated) and to flow the liquid along the capillary flow channel 5; a second sub-system 7 comprising a pressure-assisting flow channel 9, having a second flow resistance (R2), arranged to receive the liquid from the capillary flow channel, and to provide a pressure-assisted flow of the liquid in a direction away from the capillary flow channel (indicated by arrow 11); and a capillary valve 13, having a third flow resistance (R3), comprising a capillary portion 15, wherein the capillary portion 15 at a first end 17 is connected to an interface 19 between the capillary flow channel 5 and the pressure-assisting flow channel 9, and at a second end 21 is communicating with gaseous medium. The first flow resistance (R1) is larger than the third flow resistance (R3), and the second flow resistance (R2) is larger than the third flow resistance (R3), such that the liquid is flowing predominantly by capillary action in the capillary flow channel 5 until a forefront of the liquid has reached the interface 19 with the pressure-assisting flow channel 9, and by pressure-assisted capillary action after the forefront of the liquid has reached the interface 19 with the pressure-assisted flow channel 9.

The system 1 is schematically illustrated in FIG. 1. Dimensions and directions of flow channels may vary and are only schematically exemplified. The first sub-system 3 and the second sub-system 7 may be on a single and common platform or they may each be on an individual platform.

The first flow resistance may be above 5 times the third flow resistance, and the second flow resistance may be above 5 times the third flow resistance. Thereby, unperturbed flow in the capillary flow channel may be realized. In particular, the first flow resistance may be above 10 times the third flow resistance. In such a system, the pressure-assistance may essentially have no effect on the flow until the forefront of the liquid has reached and actuated the capillary valve.

Figure 2:
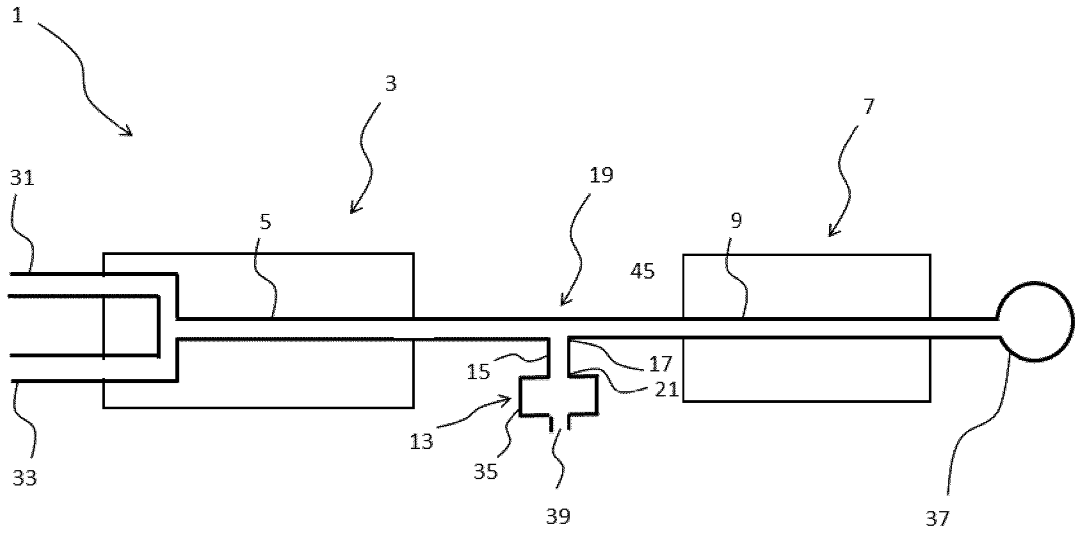
FIG. 2 is a schematic illustration of a system according to an embodiment.

With reference to FIG. 2, a system 1 according to an embodiment will now be described together with discussions related to flows and flow resistances. The system 1 comprises a first sub-system 3 having a capillary flow channel 5, the first sub-system being associated with a first flow resistance (R1), which capillary flow channel 5 in this example is arranged to receive reagent liquid via reagent inlet channel 31 and sample liquid via sample liquid inlet channel 33, which liquids are combined to a liquid in the capillary flow channel 5 along which the liquid flows by means of capillary action. The first sub-system 3 is interfaced with the pressure-assisting flow channel 9, of the second sub-system 7 being associated with a second flow resistance (R2) at the interface 19. The pressure-assisting flow channel 9 is connected to an under-pressure source 37, such as a vacuum source, preferably providing a pressure in the pressure-assisting flow channel 9 being lower than the pressure of gaseous medium communicating with the capillary valve 13. Further interfaced at the interface 19 is the capillary valve 13, having a third flow resistance (R3). The capillary valve 13 has a capillary portion 15, connected to the interface 19 at a first end 17. At a second end 21 the capillary portion 15 is communicating with gaseous medium via a non-capillary portion 35, having an opening 39 to the gaseous medium, in this example being ambient air at ambient conditions. The first flow resistance (R1) is larger than the third flow resistance (R3), and the second flow resistance (R2) is larger than the third flow resistance (R3), such that the liquid is flowing predominantly by capillary action in the capillary flow channel 5 until a forefront of the liquid has reached the interface 19 with the pressure-assisting flow channel 9, and by pressure-assisted capillary action after the forefront of the liquid has reached the interface 19 with the pressure-assisted flow channel 9. The illustrated capillary valve 13 of the system 1, thus, may function as a by-pass in a sense that gaseous medium may flow from the opening 39 via the interface 19 to the under-pressure source 37, while leaving the capillary driven flow of the liquid in the capillary flow channel 5 essentially unperturbed or little effected, until a forefront of the liquid reaches the interface 19. For example, the first flow resistance (R1) may be 10 times or larger than the third flow resistance (R3). For example, a flow resistance of a flow-channel having a rectangular cross-section, as viewed in the flow direction of the flow channel, may be calculated according to equation (1).

$$R = \frac{12\mu}{w_c h_c^3}\left\{1 - \frac{192 h_c}{\pi^8 w_c}\sum_{n=1,3,6,\ldots}^{\infty}\frac{\tanh(n\pi w_c/2h_c)}{n^8}\right\}^{-1}, \quad \text{(equation (1))}$$

wherein $w_c$ is the channel width, $h_c$ is the channel height, and μ is the dynamic viscosity of the fluid, for example approximately 1 mPa*s for water and 18 μPa*s for air. Resistances for flow channels or systems comprising flow channels which may have other geometries of cross-sections may be calculated and/or determined experimentally.

Figure 3A:
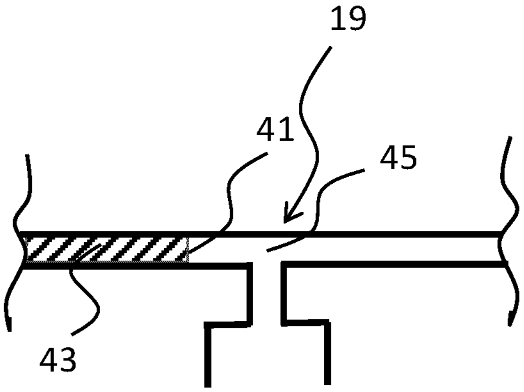
FIGS. 3*a* to 3*c* each is a schematic illustration of a portion of a system according to an embodiment.
Figure 3B:
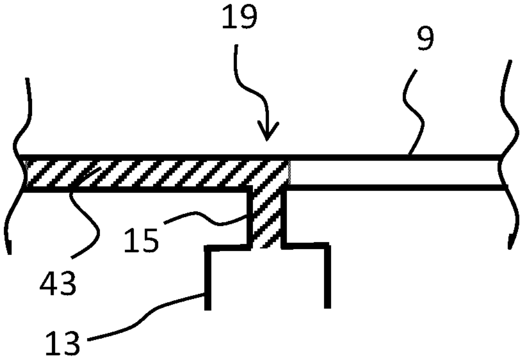
Figure 3C:
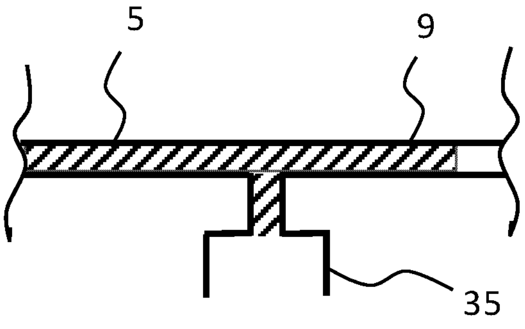

With reference to FIGS. 3*a-c*, a system 1 according to embodiments, for example, a system 1 as described with reference to FIG. 2 will now be discussed with references to different positions of the forefront of the liquid in the system 1. In an attempt to improve clarity, only a portion of the system 1 comprising the interface 19 is illustrated. FIG. 3*a* illustrates the system 1 wherein the forefront 41 of the liquid 43 is in the capillary flow-channel 5 of the first sub-system 3. The forefront 41 of the liquid 43 is in contact with gaseous medium 45 of the system. In the illustrated system, gaseous medium 45 will be flowing from ambient surroundings via the capillary valve 13 towards the under-pressure source 37, while the liquid 43 will flow essentially by capillary-action in the capillary flow channel 5 towards the interface 19. FIG. 3*b* illustrates the system 1 when the forefront of the liquid 43 has reached and just passed the interface 19, thereby blocking communication of gaseous medium 45 between the capillary valve 13 and the pressure-assisting flow channel 9. The capillary portion 15 of the capillary valve 13, when contacted with the liquid 43, is filled with liquid by capillary action, thereby, improving blocking of the gaseous communication and undesired bubble formation and entry of bubbles from the capillary valve into the pressure-assisting flow channel 9. The non-capillary portion 35 provides for efficient halt to the flow of liquid into the capillary valve 13, thereby, for example, limiting loss of liquid. In a situation illustrated in FIG. 3*b* and in FIG. 3*c*, the under-pressure provided by means of the under-pressure source 37 provides pressure-assistance to the liquid in flowing in a direction from the capillary flow-channel 5 towards the pressure-assisting flow-channel 9. Before the forefront 41 of the liquid 43 has reached the interface 19 and before the capillary valve has been actuated, the pressure-assisting flow channel 9 has limited or none effect on the flow of liquid 43 in the capillary flow channel 5, for reasons including the by-pass effect of the capillary valve 13. When the liquid forefront 41 is at the interface 19 the liquid 43 will flow into the capillary portion 15 of the capillary valve 13, thus preventing the gaseous medium from flowing into the capillary portion 15 by the under-pressure, thus preventing air bubbles from entering the pressure-assisting flow channel. This is achievable by arranging or selecting the capillary portion such that the capillary pressure in the capillary portion is larger than a pressure difference generated by the under-pressure source.

It is beneficial that a system 1 according to embodiments allows for unperturbed flow of liquid 43 by capillary action on a first sub-system 3. Such a sub-system may comprise, for example, a microfluidic chip or device with one or more flow channels and optional wells and/or compartments for, for example, reactions or mixing. A capillary flow channel 5 with unperturbed capillary flow may be connected to a pressure-assisting flow channel 9 of a second sub-system 7, without disturbance to the flow or halting of the flow as one result of the pressure-assisting, while further benefiting of the unperturbed capillary flow as one result of the capillary valve 13. Without the pressure-assisting flow channel 9, a capillary driven flow may come to a halt when two flow channels are connected, for example as a result of properties at the connection resulting in a brake in the capillary action, such as a wide cross-section, as seen in a flow direction, at the connection or interface. With the present system 1, the pressure-assisting allows the flow to proceed past such a connection or interface. The pressure-assisting of the present system 1 further enables provision of a flow into the pressure-assisting flow channel 9 also when the pressure-assisting flow channel does not provide capillary action. The first sub-system, the second sub-system and the capillary valve 13 of the present system 1, in addition to benefits discussed with reference to the pressure-assisting, together provides for benefits including unperturbed capillary action in the capillary flow-channel without a necessity of controlling or monitoring the capillary valve or the under-pressure source manually and/or by machine. Resulting from, for example, inherent properties of the capillary valve and the flow resistances chosen in accordance with aspects and embodiments, these and other beneficial properties are enabled.

The following clarifying example refers to a system as illustrated in FIG. 2, the system comprising, a first sub-system 3 and a second sub-system 7, a capillary valve 13, and an under-pressure source 37, which for this example is a vacuum source providing 2 kPa vacuum. A situation before the forefront 41 of the liquid 43 has reached the interface 19, or a situation wherein the forefront 41 is located upstream the interface 19, the capillary flow of liquid may be considered to be unperturbed if the third flow resistance (R3) <<the first flow resistance (R1) and the third flow resistance (R3)<<the second flow resistance (R2). In particular, the first flow resistance (R1) may be above 10 times the third flow resistance (R3). Since, typically, the capillary flow channel of system 1 is at least partially filled with liquid, which liquid has a higher viscosity than gaseous medium, for example air, (R1)>10(R3) is, typically, achieved during use of the system 1. Situations wherein the forefront 41 of the liquid 43 has reached the interface 19 shall now be considered. When the liquid fore front 41 is at the interface 19, the liquid may, and typically will, fill the capillary portion 15 of the capillary valve 13 before advancing into the pressure-assisting flow channel 9. The capillary valve 13 functioning to prevent gas bubbles from entering the system 1 or the pressure-assisting flow channel 9, via the capillary valve 13, may be realised by arranging for the capillary pressure at the capillary portion 15 to be larger than the under-pressure provided by the under-pressure source at the interface 19. After the forefront 41 of the liquid has passed the interface 19, gas bubbles may be prevented from entering the system 1, or the pressure-assisting flow channel 9, via the capillary valve 13, by providing conditions according to equation (2):

$$\Delta P_3 > \Delta P_2 - P_s, \qquad \text{(Equation (2))}$$

wherein $\Delta P_3$ is the capillary pressure difference over the capillary portion 15, $\Delta P_2$ is the capillary pressure difference over the pressure-assisting flow channel 9, and $P_s$ is the pressure provided by the under-pressure source 37, being a negative pressure.

Capillary pressure may be determined, for example by calculation. For example, a capillary pressure in a rectangular cross section channel may be calculated according to equation (3):

$$\Delta P = \gamma\left(\frac{2}{w_c} + \frac{2}{h_0}\right)\cos(\theta), \qquad \text{(equation (3))}$$

wherein $\gamma$ is the surface tension coefficient, for example about 0.072 N/m for water, $w_c$ is the channel width, $h_c$ is the channel height, and $\Theta$ is the contact angle of the liquid with the solid surfaces of the channel, for example, <90° for a hydrophilic material.

For example, water flowing in a 50 μm by 50 μm cross section channel with a contact angle of 45° yields a capillary pressure of about 4.1 kPa. If $P_s$, the under-pressure source, has a pressure of −2 kPa, then $\Delta P_2$ must be greater than 6.1 kPa. This means the restriction should be less than or equal to 25 μm in width assuming a depth of 50 μm.

Figure 4:
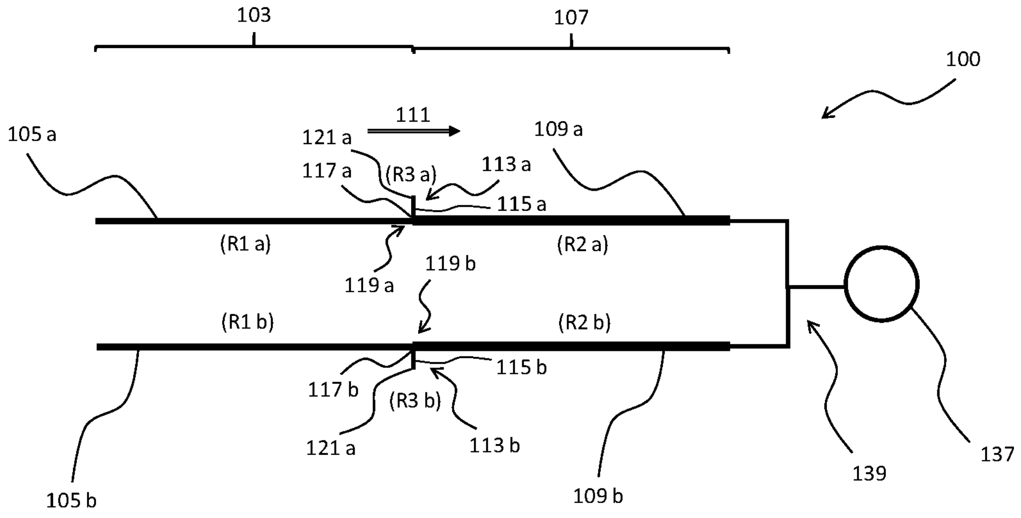
FIG. 4 is a schematic illustration of a system according to an embodiment.

With reference to FIG. 4 a microfluidic system 100 for pressure-assisted capillary-driven flowing of liquid will now be described, which system comprises a first sub-system 103 comprising two or more capillary flow channels 105*a,b*, for example two capillary flow channels 105*a,b* as exemplified and illustrated in FIG. 4, and a second sub-system 107 comprising two or more of pressure-assisting flow channels 109*a,b*, for example two pressure-assisting flow channels 109*a,b* as exemplified and illustrated in FIG. 4. The illustrated first sub-system 103, thus, comprises two capillary flow channels 105*a,b*, each having a first flow resistance (R1*a*, R1*b*), arranged to receive liquid and to flow liquid along the capillary flow channel in a direction indicated by arrow 111. The illustrated second sub-system 107, thus, comprises two pressure-assisting flow channels 109*a,b*, each having a second flow resistance R2*a,b*. As illustrated, each of the two or more of pressure-assisting flow channels 109*a* and 109*b* is associated with one of the two or more capillary flow channels 105*a* and 105*b*, respectively and arranged to receive the liquid from the associated capillary flow channel 105*a,b* and to provide a pressure-assisted flow of the liquid in a direction away from the associated capillary flow channels 105*a,b*. The pressure-assisting flow channels 109*a,b* being associated with one of the two or more capillary flow channels 105*a,b*, may be, such as in this example, by a flow channel connector which provides a fluidic connection between each associated pressure-assisting flow channel 109*a,b* and capillary flow channel 105*a,b*. Any suitable connector or associator may be used for such a purpose, such as, for example, capillary connectors, by the flow channels being fabricated on a platform such that they are fluidically connected. Further provided are two or more capillary valves 113*a,b*, in the illustrated example two capillary valves 113*a,b*, each associated with and fluidically connected to one of the one or more capillary flow channels 105*a,b*, respectively. Each of the two or more capillary valves 113*a,b* has a third flow resistance R3*a,b* and a capillary portion 115*a,b*, wherein each of the capillary portions 115*a,b* at a first 117*a,b* end is connected to an interface 119*a,b* between the connected capillary flow channel 105*a,b* and the associated pressure-assisting flow channel 109*a,b*, and at a second end 121*a,b* is communicating with gaseous medium, for example via an opening or pipings. The connection to the interface 119*a,b* is by a connection providing fluidic connection between with the interface. For example, the connection may be realised by a T-junction between for example the capillary portion 115*a*, the capillary flow channel 105*a*, and the pressure-assisting flow channel 109*a*. Each of the first flow resistances R1*a,b* of the two or more capillary flow channels is larger than the third flow resistance R3*a,b*, of the connected capillary valve 113*a,b* and each of the second flow resistances R2*a,b* of the two or more pressure-assisting flow channels 109*a,b* is larger than the third flow resistance R3*a,b* of the connected capillary valve 113*a,b*. Thereby, the liquid is flowing predominantly by capillary action in the capillary flow channels 105*a,b* until a forefront of the liquid has reached the interface 119*a,b* with the pressure-assisting flow channel 109*a,b*, and by pressure-assisted capillary action after the forefront of the liquid has reached the interface 119*a,b* with the pressure-assisted flow channel 109*a,b*. Further illustrated in FIG. 4 is an under-pressure source 137, to which the microfluidic system 100 has been connected via pipings or channels 139. Thereby and preferably, there is provided a pressure in the pressure-assisting flow channels 109*a,b* being lower than the pressure of gaseous medium communicating with the capillary valve via openings at their second ends 121*a,b*.

It is an advantage that a single under-pressure source 137 allows pressure-assisting a plurality of capillary flow channels 5, 105*a*, 105*b*, without needing active valves or controls to assist the plurality of flow channels.

The two or more capillary flow channels 105*a,b* may be provided on a single platform or on a plurality of platforms, such as a separate platform for each flow channel 105*a,b*. The platforms may be, for example, microfluidic chips.

In the above the inventive concepts has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A microfluidic system for pressure-assisted capillary-driven flowing of a liquid, the system comprising:

an under-pressure source, a first sub-system comprising a capillary flow channel, arranged to provide a first flow resistance (R1), arranged to receive the liquid and to flow the liquid along the capillary flow channel, a second sub-system comprising a pressure-assisting flow channel, arranged to provide a second flow resistance (R2), arranged to receive the liquid from the capillary flow channel, and to provide a pressure-assisted flow of the liquid in a direction away from the capillary flow channel, wherein the pressure-assisting flow channel is connected to the under-pressure source, and a passive capillary valve, comprising a capillary portion, wherein the capillary portion at a first end is connected to an interface between the capillary flow channel and the pressure-assisting flow channel, and at a second end connected to a non-capillary portion communicating with air, wherein the capillary valve is arranged to provide a third flow resistance (R3), and wherein the capillary valve (13) is arranged to provide a capillary pressure in the capillary portion of the capillary valve being larger that the pressure generated by the under-pressure source, at the interface between the capillary flow channel and the pressure-assisting flow channel, wherein the first flow resistance (R1) is in relation to the air, the second flow resistance (R2) is in relation to the air, and the third flow resistance (R3) is in relation to the air, and;

wherein the first flow resistance (R1) is larger than the third flow resistance (R3), and the second flow resistance (R2) is larger than the third flow resistance (R3), thereby arranged to allow the liquid to flow predominantly by capillary action in the capillary flow channel until a forefront of the liquid has reached the interface with the pressure-assisting flow channel, and by pressure-assisted capillary action after the forefront of the liquid has reached the interface with the pressure-assisted flow channel.

2. The microfluidic system according to claim 1, wherein the first flow resistance (R1) is above and up to twenty times the third flow resistance (R3), preferably 5 to 10 times.

3. The microfluidic system according to claim 1, wherein the under-pressure source, such as a vacuum source, is arranged to provide a pressure in the pressure-assisting flow channel being lower than the pressure of the air communicating with the capillary valve.

4. The microfluidic system according to claim 1, wherein the capillary valve communicates with air at ambient pressure.

5. The microfluidic system according to claim 1, wherein the capillary flow channel has a circular cross-section having a diameter in a range of 1-250 micrometers, or a rectangular cross-section having a height or a width in a range of 1-250 micrometers, the pressure-assisting flow channel has a circular cross-section having a diameter in a range of 10-2500 micrometers, or a rectangular cross-section having a width and a height both in a range of 10-2500 micrometers, and the capillary portion of the capillary valve has a circular cross-section having a diameter in a range of 1-250 micrometers, or a rectangular cross-section having a height or a width in a range of 1-250 micrometers.

6. The microfluidic system according to claim 1, wherein the capillary flow channel, the pressure-assisting flow channel and the capillary portion of the capillary valve, respectively, have walls produced from a material selected from silicon, glass, polymers, ceramics, and metals, or combinations thereof.

7. The microfluidic system according to claim 1, wherein the first and the second sub-systems are provided on one or more microfluidic chips.

8. The system according to claim 1, wherein the capillary portion of the valve connects to the interface perpendicularly to a common longitudinal central axis of the capillary flow channel and the pressure-assisting flow channel.

9. The microfluidic system according to claim 1, wherein:

the first sub-system comprises two or more capillary flow channels, each arranged to provide a first flow resistance (R1*a*, R1*b*), arranged to receive liquid and to flow liquid along the capillary flow channel, the second sub-system comprising two or more of pressure-assisting flow channels, each arranged to provide a second flow resistance (R2 *a,b*), wherein each of the two or more of pressure-assisting flow channels is associated with one of the two or more capillary flow channels, respectively and arranged to receive the liquid from the associated capillary flow channel, and to provide a pressure-assisted flow of the liquid in a direction away from the associated capillary flow channels, wherein two or more of the pressure-assisting flow channels (109 *a,b*), further are arranged to be connected to one under-pressure source, and wherein the system comprises two or more capillary valves, each connected to one of the one or more capillary flow channels, and a capillary portion, respectively, wherein each of the capillary portions at a first end is connected to an interface between the connected capillary flow channel and the associated pressure-assisting flow channel, and at a second end connected to a non-capillary portion communicating with air, wherein each of the two or more capillary valves is arranged to provide a third flow resistance (R3 *a,b*), and wherein the two or more capillary valves (113 *a,b*) each are arranged to provide a capillary pressure in the capillary portion (115 *a,b*) of the respective capillary valve (113 *a,b*) being larger that the pressure generated by the under-pressure source, at the interface (119 *a,b*) between the connected capillary flow channel (105 *a,b*) and the associated pressure-assisting flow channel (109 *a,b*), wherein the first flow resistance (R1*a*, R1*b*) is in relation to the air, the second flow resistance (R2 *a,b*) is in relation to the air, and the third flow resistance (R3 *a,b*) is in relation to the air, and;

wherein each of the first flow resistances (R1 *a,b*) of the two or more capillary flow channels is larger than the third flow resistance (R3 *a,b*) of the connected capillary valve, and each of the second flow resistances (R2 *a,b*) of the two or more pressure-assisting flow channels is larger than the third flow resistance (R3 *a,b*) of the connected capillary valve, thereby arranged to allow the liquid to flow predominantly by capillary action in each of the capillary flow channels until a forefront of the liquid has reached the interface with the pressure-assisting flow channel, and by pressure-assisted capillary action after the forefront of the liquid has reached the interface with the pressure-assisted flow channel.

10. The microfluidic system according to claim 9, wherein the one under-pressure source, such as a vacuum source, is arranged to provide a pressure in the two or more pressure-assisting flow channels being lower than the pressure of the air communicating with the capillary valve.

11. A diagnostic device comprising a microfluidic system according to claim 1.

12. A lab-on-a-chip device comprising a microfluidic system according to claim 1.

* * * * *